Patented Aug. 14, 1928.

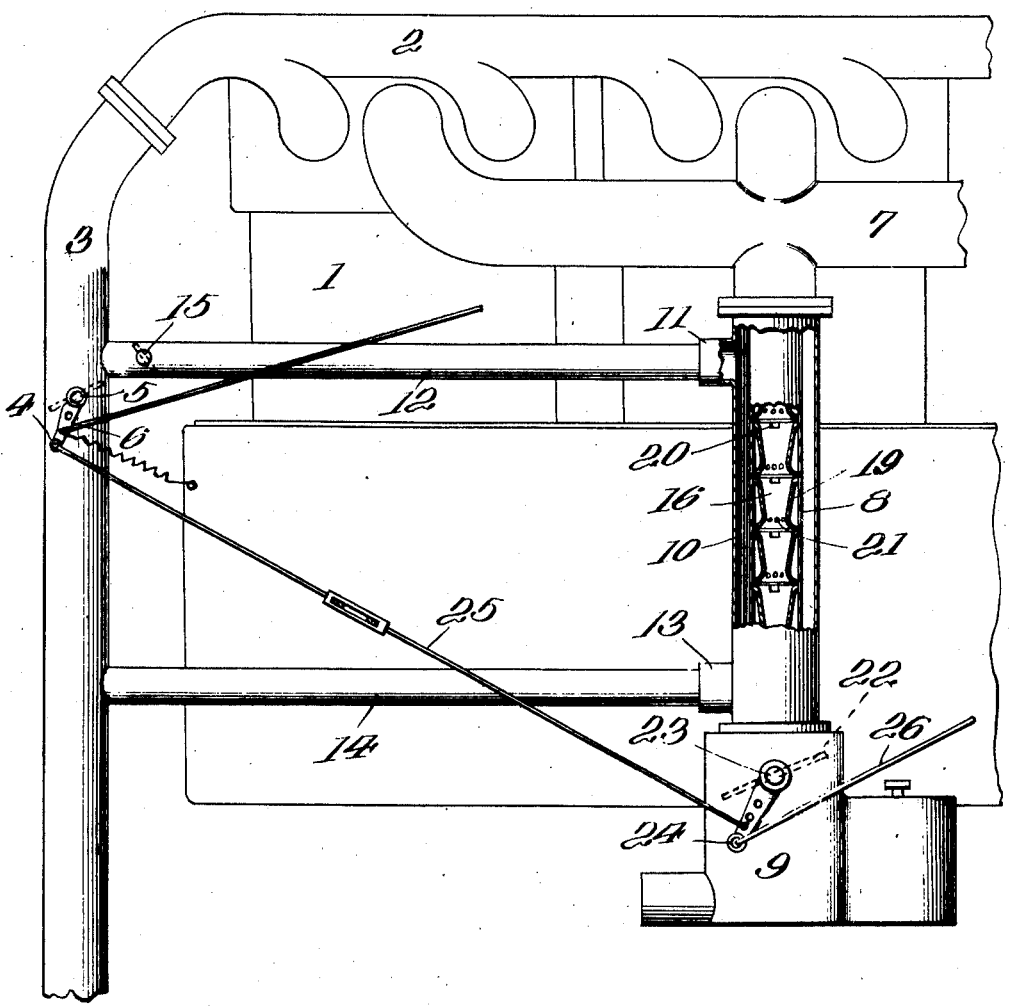

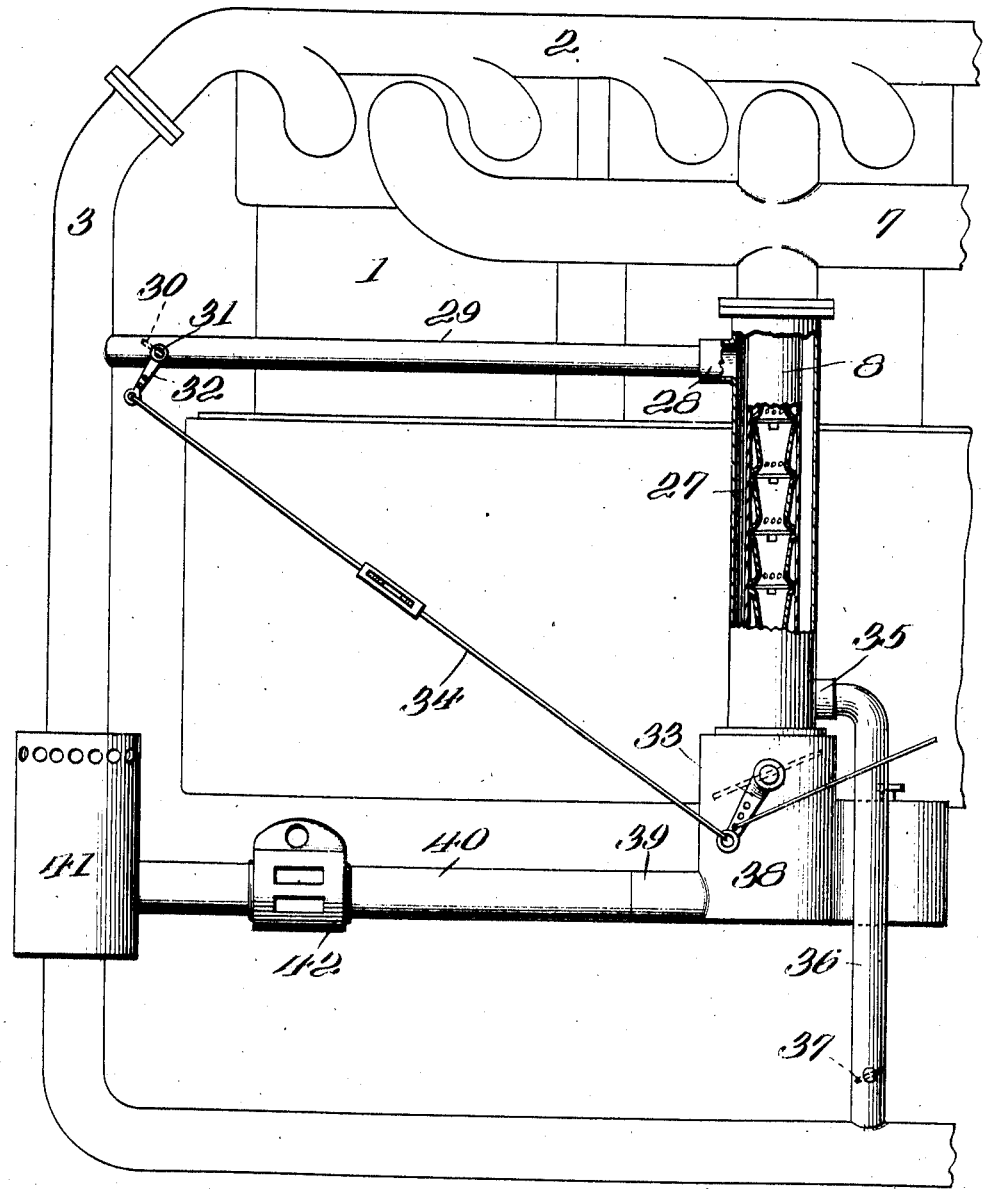

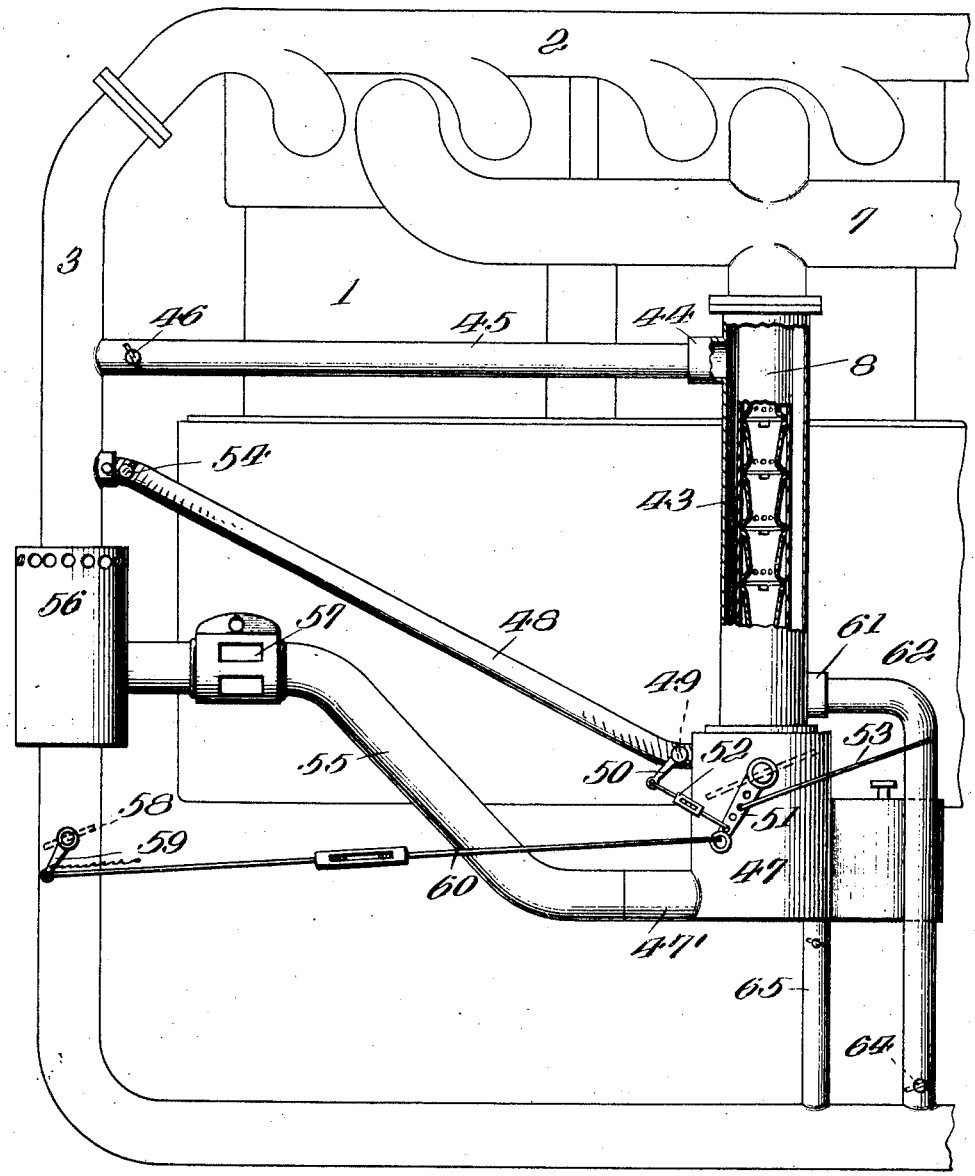

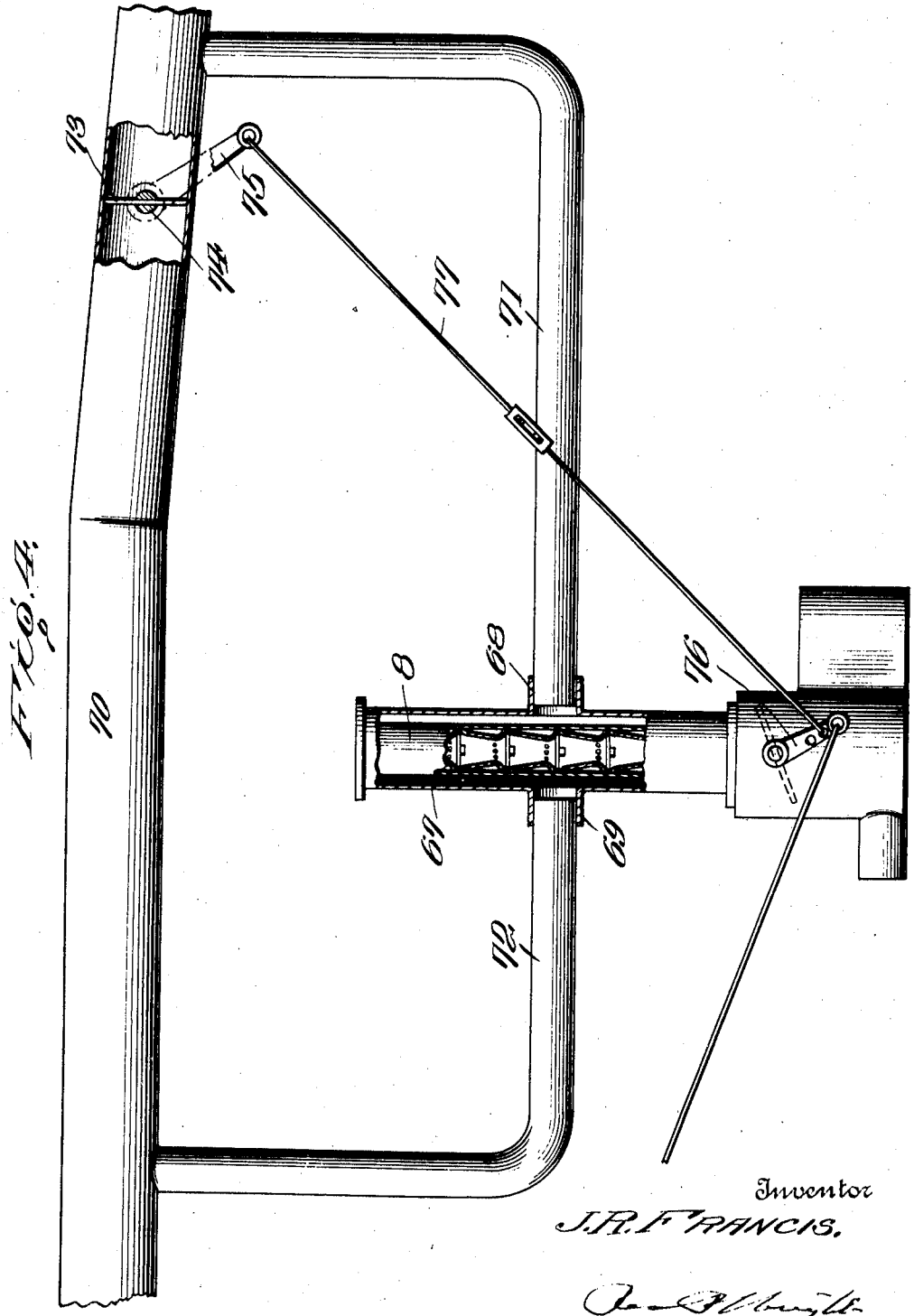

1,680,373

UNITED STATES PATENT OFFICE.

JACOB RICHARD FRANCIS, OF FLINT, MICHIGAN.

INTAKE MANIFOLD AND HEATING-MEDIUM CONTROL FOR INTERNAL-COMBUSTION ENGINES.

Application filed January 18, 1922. Serial No. 530,022.

This invention relates to certain new and useful improvements in intake manifolds and heating medium control for internal combustion engines, the object being to provide the induction pipe with a series of restrictions having means for collecting the heavy particles of fuel thrown outwardly at the point of least restriction and vaporizing these particles and returning the same to the induction pipe in connection with means for controlling the application of the heating medium to the heating chamber surrounding said induction pipe whereby the entire volume of exhaust gases from the internal combustion engine can be diverted through the heating chamber surrounding said induction pipe.

Another and further object of the invention is to provide novel means for operating the valve for controlling the passage of the exhaust gases to the heating chamber of the induction pipe whereby the same can be operated manually or automatically in connection with the throttle valve so that the volume of the heating medium will be decreased as the speed of the motor is increased.

A further object of the invention is to provide an air heater in connection with the above said heating means whereby the air to the charge forming device or carbureter will be heated, means being provided for regulating the temperature of the air delivered to the said carbureter through the medium of an air shutter.

Other and further objects and advantages of the invention will be hereinafter set forth and the novel features thereof defined by the appended claim.

In the drawings:

Figure 1 is a side elevation of an internal combustion engine showing the induction pipe partly in section and the heating means;

Figure 2 is a similar view showing an air heater incorporated in the construction of heating means illustrated in Figure 1, the control of the exhaust gases being in the form of a valve outside of the main exhaust pipe;

Figure 3 is a similar view showing the application of a Marvel type carbureter in connection with an induction pipe and heating means whereby the air will be heated in its passage to the carbureter, the explosive charge in its passage through the induction pipe and the mixing chamber of the carbureter heated by a jacket; and Figure 4 is still another form of heat control.

In the embodiment of my invention as shown in Figure 1, 1 indicates an internal combustion engine, 2 the exhaust manifold, 3 the exhaust pipe which is herein shown provided with a valve 4 carried by a stem 5 having an arm 6 connected thereto.

The internal combustion engine is provided with a sectional manifold composed of an upper or distributing section 7 and a feed section 8 which is connected to a charge forming device 9. The lower section of the induction pipe or manifold 8 is surrounded by a heat jacket 10 having an inlet 11 connected by a pipe 12 to the exhaust pipe 3 to the engine side of the valve 4 and an outlet pipe 13 connected to the exhaust pipe 3 by a pipe 14 to the muffler side of the valve 4 whereby the entire volume of gases from the exhaust manifold or exhaust pipe can be diverted out of its natural path of travel through the heat jacket 16.

The pipe 12 is provided with a valve 15 which can be manually operated for controlling the volume of gases passing to the heating chamber as desired. Arranged within the lower section of the induction pipe 8 is a series of Venturi tubes 16 arranged in tandem as clearly shown. The outer walls of the venturis are annularly recessed to form chambers 19, the outer wall of which is formed by the induction pipe 8, which forms the inner wall of the heat jacket to enable the application of heat to the sections so that the annular chambers 19 will be heated to a high degree of temperature.

The chambers 19 are provided with inlets 20 at their upper end or at the point of least restriction and outlets 21 at the point or approximately the point of greatest restriction, the particular construction of induction pipe being shown in an application filed by Walter G. Heginbottom and myself November 25, 1921, Serial No. 517,555.

It will thus be seen that the outer wall of the chambers 19 formed by the section 8 of the induction pipe becomes heated by the exhaust gases passing through the heating chamber 10 so that the heavier particles which run down the series of Venturi tubes pass into the chambers at the upper ends and are vaporized and discharged at their lower ends and I have found that in order to obtain the best result it is necessary to provide means for controlling the application of the heating medium in order to prevent the overheating of the charge in its passage to the internal combustion engine.

The charge forming device or carbureter 9 is provided with a throttle valve 22 carried by a stem 23 provided with an arm 24 which is connected to the arm 6 of the valve 4 by an adjustable rod 25 whereby the valve 4 will be opened as the throttle valve of the charge forming device is opened so that the volume of exhaust gases passing into the heating chamber will be decreased as the speed of the motor is increased and while I have shown these valves connected in this particular manner, it is, of course, understood that the relative position of the two valves can be set so that the valve 4 will remain closed until the throttle valve has opened to any extent desired and by forming the arms 6 and 24 with a plurality of openings, the adjustment between the two valves can be accomplished.

The arm 24 of the throttle valve is connected to the dash by the usual dash controlled rod 26 in the usual manner as clearly shown.

In the embodiment of the invention as shown in Figure 2 the lower section 8 of the intake manifold is constructed identically as that shown in Figure 1 and the same is surrounded by a heat jacket 27 which is provided with an inlet 28 connected to the exhaust pipe 3 by a pipe 29 which is provided with a valve 30 carried by stem 31 having an arm 32 connected thereto which is adjustably connected to the throttle valve arm 33 by a rod 34.

The heat jacket 27 is provided with an outlet 35 which is connected to the exhaust pipe 3 by pipe 36 which may be provided with a valve 37 so that it can be operated manually in order to control the volume of exhaust gases passing through the heat jacket. The charge forming device 38 is provided with an air inlet 39 to which is connected an air pipe 40 extending from a heater 41 surrounding the exhaust pipe 3 and provided with an air shutter 42 controlling the temperature of the air delivered to the carbureter.

In this construction instead of providing means for diverting the entire volume of exhaust gases through the heating chambers surrounding the induction pipe, I provide means for controlling the passage of the heating medium through a pipe leading to the heating chamber.

In the embodiment of the invention as shown in Figure 3, the induction pipe 8 is constructed in substantially the same manner as shown in Figures 1 and 2 and is provided with a series of Venturi tubes provided with chambers for collecting and vaporizing the heavy particles of fuel and said induction pipe is surrounded by a heating chamber 43 having an inlet 44 connected to the exhaust pipe 3 by a pipe 45, which is provided with a manually operated valve 46 controlling the volume of exhaust gases passing therethrough.

In this construction I have shown a Marvel type carbureter 47 connected to the induction pipe which is provided with a heating chamber surrounding the mixing chamber thereof having an inlet pipe 48 extending from the exhaust pipe 3 provided with a valve 49 carrying an arm 50 which is adjustably connected to the throttle valve arm 51 by an adjustable link 52, said throttle valve arm being provided with a dash control rod 53.

The pipe 48 is also provided with a manually operated valve 54 which can be predeterminedly set so as to control the volume of exhaust gases passing therethrough. In this form of heat control the carbureter 47 is provided with an air inlet pipe 47', to which is connected an air pipe 55 extending from a heater 56 surrounding the exhaust pipe 3 and provided with an air shutter 57. The exhaust pipe 3 is provided with a valve 58 completely closing the same having an operating arm 59 which is connected to the throttle valve arm 51 by an adjustable rod 60 and it will be seen that by this construction that when the valve 58 is in closed position, the entire volume of exhaust gases are diverted from the exhaust pipe 3 into the heating chamber 43 surrounding the induction pipe. To carry these exhaust gases off I provide the heating chamber 43 with an outlet 61 having a pipe 62 connected thereto which is connected to the exhaust pipe 3 and provided with a valve 64.

The outlet of the heating chamber surrounding the charge forming device or carbureter of the Marvel type is provided with a pipe 65 extending to the exhaust pipe 3 and provided with a valve for controlling the flow of exhaust gases therethrough.

In this form of heating arrangement as shown I have a dual control for heating the explosive charge as well as the air and I am aware that by removing the link 52 so as to disconnect the throttle control arm 51 from the valve arm 50, the passage of the exhaust gases will not be automatically controlled by the movement of the throttle to the heating chamber surrounding the mixing chamber of the carbureter and while I have shown both of these connections in use, either one of the connecting rods 52 or 60 can be disconnected so as to allow the exhaust gases to pass through the heating chambers.

I am also aware that the construction of operating these valves can be such that a manual dash controlled connection could be formed whereby the valve controlling the passage of exhaust gases could be operated independent of the throttle valve and I do not wish to limit myself to the details of construction and arrangement of connecting these various parts as I am aware that various connections can be made and various constructions changed without departing from the spirit of my invention.

While in all of the drawings I have failed to show a dash control extending from the valve in the exhaust pipe or its equivalent, in Figure 1 I have shown a manually controlled rod 66 extending from the dash connected to the arm 6 of the valve. This construction can be used in connection with any of the various constructions of valves as shown in the various figures without departing from the spirit of my invention.

I am also aware that in some cases it may be necessary to provide means for normally holding the exhaust throttle valve in open position by a spring so that when the operating means is released, the valve will be returned to open position.

In the embodiment of the invention as shown in Figure 4, the induction pipe section 8 is surrounded by a heating chamber 67 having an inlet 68 on one side and an outlet 69 on the other side, which is connected to the exhaust pipe 70 by pipes 71 and 72, the exhaust pipe 70 being provided with a valve 73 carried by a stem 74 having an arm 75 connected thereto, which is connected to the throttle valve arm 76 by an adjustable link 77 so that as the throttle valve of the charge forming device is operated, the valve 73 will also be operated in order to control the passage of exhaust gases through the heating chamber 67.

This arrangement is especially adapted to be used in various forms of internal combustion engines where the exhaust is arranged at a different angle from that shown in the other figures and the movement of the valve 73 in respect to the throttle valve of the charge forming device is such that the exhaust throttle valve remains closed until after the throttle valve has commenced to open.

From the foregoing description it will be seen that I have provided a novel form of intake manifold and heating medium control for internal combustion engines whereby the heavier particles of the explosive charge delivered from the charge forming device are collected and revaporized in connection with novel means for controlling the application of heat to the vaporizing means and while I have shown various forms of heating medium control in connection with means for heating the air delivered to the charge forming device, I am aware that the means for connecting these various controls to the throttle lever can be changed and I therefore, do not wish to limit myself to the exact details of construction shown.

What I claim is:—

The combination with an internal combustion engine having an exhaust passage, intake passage connected thereto, of a charge forming device connected to said intake passage having a throttle valve and provided with an annular heating chamber, said intake passage being provided with a plurality of annular chambers provided with inlets and outlets, a heater for heating said passages, pipes connecting said exhaust passage to said heaters, a pipe connecting the exhaust passage to said heating chamber surrounding the mixing chamber of said charge forming device being provided with a valve, a valve disposed in said exhaust passage, a connection between said valves and said throttle valve and an air heater disposed in said exhaust passage on the engine side of said valve for supplying warm air to said charge forming device.

In testimony whereof I hereunto affix my signature.

JACOB RICHARD FRANCIS.